United States Patent [19]

Travers et al.

[11] Patent Number: 5,534,658
[45] Date of Patent: Jul. 9, 1996

US005534658A

[54] PROCESS FOR REDUCING THE BENZENE CONTENT OF PETROLS

[75] Inventors: Christine Travers, Rueil Malmaison; Philippe Courty, Houilles; Patrick Sarrazin, Rueil Malmaison, all of France

[73] Assignee: Institut Francais du Petrole, Rueil Malmaison, France

[21] Appl. No.: 477,588

[22] Filed: Jun. 7, 1995

Related U.S. Application Data

[62] Division of Ser. No. 365,930, Dec. 29, 1994.

[30] Foreign Application Priority Data

Dec. 29, 1993 [FR] France .................................. 93 15953

[51] Int. Cl.$^6$ .............................. C07C 5/13; C07C 5/22; C10G 35/06
[52] U.S. Cl. .......................... 585/738; 585/253; 585/258; 585/260; 585/261; 208/138; 208/139; 208/141
[58] Field of Search ..................................... 585/253, 258, 585/260, 261, 738; 208/138, 139, 141

[56] References Cited

U.S. PATENT DOCUMENTS

| | | |
|---|---|---|
| 3,025,248 | 3/1962 | Oleck et al. |
| 3,173,856 | 3/1965 | Burton et al. ........................... 208/138 |
| 3,717,586 | 2/1973 | Suggitt et al. ........................... 502/224 |
| 3,871,996 | 3/1975 | Sinfelt .................................. 208/138 |
| 3,903,192 | 1/1975 | Torck et al. ............................ 585/748 |
| 3,925,196 | 12/1975 | Sinfelt et al. ........................... 208/139 |
| 5,017,541 | 5/1991 | Schmidt et al. .......................... 502/66 |
| 5,290,426 | 3/1994 | Cody et al. ............................. 585/737 |
| 5,401,705 | 3/1995 | Amelse ................................. 502/327 |

FOREIGN PATENT DOCUMENTS

| | | |
|---|---|---|
| 0552069 | 7/1993 | European Pat. Off. . |
| 1220868 | 5/1960 | France . |
| WO92/20759 | 11/1992 | WIPO . |

*Primary Examiner*—E. Rollins Cross
*Assistant Examiner*—E. D. Irzinski
*Attorney, Agent, or Firm*—Millen, White, Zelano, & Branigan

[57] ABSTRACT

The invention concerns a process for reducing the benzene content of petrol fractions and isomerizing paraffins in the presence of an isomerization catalyst comprising 4 to 15% of at least one halogen and at least one metal from group VIII deposited on a support composed of a mixture of specific proportions of eta alumina and gamma alumina, in which isomerization is carried out on a mixture of a) a feed with the following composition by weight: 40% to 80% of paraffins, 0.5% to 7% of cyclic hydrocarbons and 6% to 45% of aromatics, and with a maximum distillation temperature of between 70° C. and 90° C., b) a $C_5$–$C_6$ cut which is generally a straight run cut, and c) a chlorine-containing compound providing a concentration of 50–5000 ppm of chlorine in the mixture.

19 Claims, No Drawings

PROCESS FOR REDUCING THE BENZENE CONTENT OF PETROLS

This is a division of the application Ser. No. 08/365,930, filed Dec. 29, 1994.

BACKGROUND OF THE INVENTION

The invention concerns a process for reducing the benzene content of petrol fractions and isomerising paraffins in the presence of an isomerisation catalyst comprising 4 to 15% of at least one halogen and at least one metal from group VIII deposited on a support composed of a mixture of specific proportions of eta alumina and gamma alumina, in which a feed such as a light reformate and/or a $C_5$–$C_6$ cut is isomerised.

Environmental problems have led to a joint reduction in the lead content and the benzene content in the petrol (gasoline) pool, preferably without reducing the octane number. Catalytic reforming under very severe conditions and isomerisation of normal $C_5$–$C_6$ paraffins with a low octane number are currently the most frequently used processes for producing high octane numbers without adding lead. However, catalytic reforming produces large quantities of benzene with a high octane number. Thus it is necessary to develop new processes which can reduce the benzene content in a petrol while complying with octane number specifications.

The combination of catalytic reforming and isomerisation, consisting in separating the $C_5$–$C_6$ fraction from the reformate, isomerising it and introducing it directly into petrol fractions to improve the octane number, are well known: this is, for example, described in U.S. Pat. Nos. 4,457,832, 4,181,599 and 3,761,392. Isomerisation of the $C_5$–$C_6$ cut from a straight run crude is also well known. The octane number of the cut is considerably improved. The benzene content of the reformate can be reduced in different ways, such as modifying the naphtha cut point between reforming and isomerisation or separating the reformate into two fractions: a heavy fraction (heavy reformate) and a light fraction (light reformate), all the benzene being concentrated in said light fraction. The light fraction is then sent to a hydrogenation unit which transforms the benzene into naphthenes which are then ring opened in an isomerisation unit working under severe conditions. The normal paraffins formed are isomerised using a conventional isomerisation process (U.S. Pat. No. 5,003,118). In addition, European patent application EP-A-0 552 070 concerns a process for reducing the benzene content of a petrol fraction comprising hydrogenation of a feed with the following composition by weight: 40% to 80% of paraffins, 0.5% to 7% of cyclic hydrocarbons and 6% to 45% of aromatics, and with a maximum distillation temperature of between 70° C. and 90° C. The hydrogenation effluent is then isomerised, mixing said charge and/or said effluent with a $C_5$–$C_6$ cut.

European patent application EP-A-0 552 069 further concerns a process for the isomerisation of a feed such as a light reformate and/or a $C_5$–$C_6$ cut in the presence of an isomerisation catalyst which preferably comprises at least one group VIII metal and a mordenite with a Si/Al ratio of between 5 and 50.

U.S. Pat. No. 3,025,248 describes a process for the production of a catalyst with an alpha and beta alumina based support which is treated to convert the aluminas into eta and gamma aluminas. The catalyst also contains a small quantity of platinum or another metal such as palladium, nickel, iron or cobalt, and optionally a trace of chlorine.

SUMMARY OF THE INVENTION

The present invention involves a catalyst for use in a process for reducing the benzene content of petrol fractions.

The support for such a catalyst is constituted by eta alumina and gamma alumina, the eta alumina content in the support being between 85% and 95% by weight, preferably between 88% and 92% by weight, more preferably between 85% and 91% by weight, the complement to 100% of the su-port being constituted by gamma alumina, said catalyst also comprising 4% to 15%, preferably 6% to 15%, more preferably 6% to 11%, of at least one halogen, preferably chlorine, and at least one group VIII metal.

The eta alumina used in the present invention generally has a specific surface area of between 400 and 600 m$^2$/g, preferably between 420 and 550 m$^2$/g, and a total pore volume which is generally between 0.3 and 0.5 cm$^3$/g, preferably between 0.35 and 0.45 cm$^3$/g.

The gamma alumina used in the present invention generally has a specific surface are of between 150 and 300 m$^2$/g, preferably between 180 and 250 m$^2$/g, and a total pore volume which is generally between 0.4 and 0.8 cm$^3$/g, preferably between 0.45 and 0.7 cm$^3$/g.

The two types of alumina are mixed and formed in the proportions defined above, using any technique which is known to the skilled person, for example extrusion through a die, pelletizing or coating.

The support obtained generally has a specific surface area of between 300 and 550 m$^2$/g, preferably between 350 and 500 m$^2$/g, and a pore volume generally between 0.3 and 0.6 cm$^3$/g, preferably between 0.35 and 0.5 cm$^3$/g.

At least one hydrogenating metal from group VIII, preferably selected from the group formed by platinum, palladium and nickel, is then deposited on the support using any technique which is known to the skilled person, for example anion exchange using hexachloroplatinic acid in the case of platinum, or palladium chloride in the case of palladium.

When platinum or palladium is used, the concentration is between 0.05% and 1% by weight, preferably between 0.1% and 0.6% by weight. When nickel is used, the concentration is between 0.1% and 10% by weight, preferably between 0.2% and 5% by weight.

The catalyst thus prepared can be reduced in hydrogen then halogenated using any halogen compound which is known to the skilled person. In the case of chlorine, the halogenated compound can be carbon tetrachloride or perchloroethylene. The halogen content, preferably chlorine, in the finished catalyst is between 4% and 15% by weight, preferably between 6% and 15% by weight, more preferably between 6% and 11%.

This halogenation treatment can either be carried out directly in the unit before injection of the feed, or offsite. Halogenation can also be carried out prior to reducing the catalyst in hydrogen.

This catalyst is used in a process particularly for reducing the benzene content in petrol fractions, in which a feed such as a light reformate fraction and/or a $C_5$–$C_6$ cut, generally a straight run cut, is isomerised. Surprisingly, an effluent is obtained which is practically free of benzene (i.e., contains less than 0.1% of benzene) and has a research octane number which is greater than or equal to the research octane number of the light reformate, and which can then be directly incorporated into petrol fractions following stabilisation.

The light reformate fraction is obtained by distilling the reformate. It is defined by a maximum distillation temperature of between 70° C. and 90° C., preferably between 77°

C. and 83° C., and the following composition by weight: 40.0% to 80.0% of paraffins, 0.5% to 7.0% of cyclic hydrocarbons (such as methylcyclopentane, cyclopentane and cyclohexane), and 6.0% to 45.0% of aromatics. The distillation temperature is generally between room temperature and the maximum distillation temperature (or overhead temperature).

The aromatic hydrocarbons are generally substantially constituted by benzene. In additions, between 1.0% and 3.0% of olefinic hydrocarbons can be present in the light fraction. In general, the light fraction has the following properties: an average molecular weight of between 70 and 90 g/mole, a density of between 0.670 and 0.780 g/cm$^3$ at 15° C. and a research octane number of between 75 and 90.

Any other hydrocarbon feed which has the following composition by weight can be used: 40% to 80% of paraffins, 0.5% to 7% of cyclic hydrocarbons and 6% to 45% of aromatics, and by a maximum distillation temperature of between 70° C. and 90° C., preferably 77° C. to 83° C.

The composition by weight of the $C_5$–$C_6$ cut, normally a straight run cut, depends on the nature of the untreated crude.

Nevertheless, the cut can be generally defined by a paraffin content which is generally greater than 90% by weight, a cyclic hydrocarbon content which is generally less than 10% by weight and a benzene content which is generally less than 1.5% by weight. The research octane number is generally between 60 and 75.

The cut may also contain very small quantities of compounds containing 4 carbon atoms per molecule (less than 0.5% by weight).

In accordance with the present invention, the two feeds described above are mixed then sent to the isomerisation unit. The $C_5$–$C_6$ cut content in the mixture can be varied from 10% to 90%, preferably from 15% to 55%.

A chlorine-containing compound, such as carbon tetrachloride or perchloroethylene, is added to the above mixture before it enters the isomerisation zone, such that the chlorine content in the feed is between 50 and 5000 ppm, preferably between 100 and 1000 ppm.

The isomerization zone is operated under normal isomerisation conditions. It is contained in at least one reactor.

The temperature is between 100° C. and 300° C., preferably between 120° C. and 250° C., and the partial pressure of hydrogen is between atmospheric pressure and 70 bars, preferably between 5 and 50 bar. The space velocity is between 0.2 and 10 liters, preferably between 0.5 and 5 liters of liquid hydrocarbon per liter of catalyst per hour. The hydrogen/hydrocarbon molar ratio at the reactor inlet is such that the hydrocarbon/hydrocarbon molar ratio in the effluent is greater than 0.06, preferably between 0.06 and 10.

The stabilised effluent obtained thus has an octane number which is sufficiently high for it to be incorporated into the petrol pool after stabilisation and is practically completely free of benzene (less than 0.1% by weight in the effluent).

The following examples illustrate the invention without limiting its scope.

EXAMPLE 1

In Accordance with the Invention

A light reformate obtained after distillation at 80° C., containing 21.5% of benzene and with an octane number of 80.3, was mixed in a proportion of 50% by weight with a $C_5$–$C_6$ straight run cut containing 0.7% of benzene and with an octane number of 65. The compositions of the two products are shown in Table 1. The light reformate contained 21.5% of aromatics, 4% of cyclic hydrocarbons and 74.5% of paraffins. The $C_5$–$C_6$ cut contained 0.7% of benzene, 7.25% of cyclic hydrocarbons and 92.05% of paraffins. The mixture of the two feeds, with the composition shown in Table 1, was sent to an isomerisation unit at a temperature of 170° C. and at a pressure of 30 bar. The space velocity was 2 liters of liquid hydrocarbon per liter of catalyst per hour and the hydrogen/hydrocarbon molar ratio of the feed was such that the same ratio in the effluent was 0.07.

The catalyst used was composed of 0.3% by weight of Pt deposited on a support constituted by 90% by weight of eta alumina and 10% by weight of gamma alumina. This catalyst was then chlorinated to 9% by weight of Cl. The effluent from the isomerisation unit had the composition given in Table 1. It was practically free of benzene and has an octane number of 81.5. It could then be incorporated directly into petrol fractions after stabilisation.

TABLE 1

|  | Reformate | $C_5$–$C_6$ distillation cut | isomerisation inlet feed | isomerisation outlet effluent |
| --- | --- | --- | --- | --- |
| Lights | 6.5 | 1.0 | 3.7 | 6.0 |
| $iC_5$ | 9.9 | 18.9 | 14.4 | 23.7 |
| $nC_5$ | 7.1 | 25.4 | 16.25 | 7.4 |
| $22DMC_4$ | 3.0 | 0.4 | 1.7 | 13.2 |
| $23DMC_4$ | 4.1 | 1.85 | 3.0 | 4.9 |
| $2MC_5$ | 15.8 | 11.1 | 13.45 | 16.5 |
| $3MC_5$ | 12.5 | 9.4 | 11.0 | 10.1 |
| $nC_6$ | 12.1 | 19.6 | 15.9 | 6.7 |
| $C_7$ | 3.5 | 4.4 | 3.9 | 3.0 |
| $CC_5$ | 0.4 | 1.4 | 0.9 | 0.5 |
| $MCC_5$ | 3.6 | 4.1 | 3.85 | 4.9 |
| $CC_6$ | 0 | 1.75 | 0.85 | 3.1 |
| Benzene | 21.5 | 0.7 | 11.1 | — |
| RON | 80.3 | 65 | 72.9 | 81.5 |

EXAMPLE 2

In Accordance with the Invention

Six catalysts were prepared with references A to F, composed of 0.3% of Pt deposited on a support comprising a mixture of eta alumina and gamma alumina, the eta alumina content of the support being varied from 85% to 95% as shown in Table 2. The catalysts thus defined were chlorinated to 9% by weight of chlorine. The inlet feed for the isomerisation unit, with the composition shown in Table 1, was sent to an isomerisation unit operating under the conditions described for Example 1. The RON obtained after isomerisation are shown in Table 2. It can be seen that the maximum RON was obtained when the eta alumina content in the support was between 89% and 91%.

TABLE 2

|  | A | B | C | D | E | F |
| --- | --- | --- | --- | --- | --- | --- |
| η $Al_2O_3$ content in support (%) | 85 | 88 | 89 | 91 | 92 | 95 |
| RON after isomerisation | 81 | 81.2 | 81.5 | 81.5 | 81.2 | 81 |

EXAMPLE 3

In Accordance with the Invention

The present Example differed from Example 1 only in that the chlorine content of the catalyst used in the isomerisation unit was 7% by weight.

The effluent from the isomerisation unit had the composition given in Table 3. It no longer contained benzene and had an octane number of 80.3. It could thus be directly incorporated into petrol fractions after stabilisation.

TABLE 3

|  | Reformate | $C_5$–$C_6$ distillation cut | isomerisation inlet feed | isomerisation outlet effluent |
|---|---|---|---|---|
| Lights | 6.5 | 1.0 | 3.7 | 6.0 |
| $iC_5$ | 9.9 | 18.9 | 14.4 | 22.2 |
| $nC_5$ | 7.1 | 25.4 | 16.25 | 8.9 |
| $22DMC_4$ | 3.0 | 0.4 | 1.7 | 12.7 |
| $23DMC_4$ | 4.1 | 1.85 | 3.0 | 4.5 |
| $2MC_5$ | 15.8 | 11.1 | 13.45 | 16.5 |
| $3MC_5$ | 12.5 | 9.4 | 11.0 | 10.1 |
| $nC_6$ | 12.1 | 19.6 | 15.9 | 7.6 |
| $C_7$ | 3.5 | 4.4 | 3.9 | 3.0 |
| $CC_5$ | 0.4 | 1.4 | 0.9 | 0.5 |
| $MCC_5$ | 3.6 | 4.1 | 3.85 | 4.9 |
| $CC_6$ | 0 | 1.75 | 0.85 | 3.1 |
| Benzene | 21.5 | 0.7 | 11.1 | — |
| RON | 80.3 | 65 | 72.9 | 80.3 |

EXAMPLE 4

Comparative

Example 4 differed from Example 3 only in that the catalyst used in the isomerisation zone was composed of 0.3% by weight of Pt deposited on a support constituted by 50% by weight of eta alumina and 50% by weight of gamma alumina. The catalyst thus defined was then chlorinated. The finished chlorine content was 7% by weight.

Table 4 gives the composition of the effluent leaving the isomerisation unit.

TABLE 4

|  | Reformate | $C_5$–$C_6$ distillation cut | isomerisation inlet feed | isomerisation outlet effluent |
|---|---|---|---|---|
| Lights | 6.5 | 1.0 | 3.7 | 65.5 |
| $iC_5$ | 9.9 | 18.9 | 14.4 | 18.4 |
| $nC_5$ | 7.1 | 25.4 | 16.25 | 12.3 |
| $22DMC_4$ | 3.0 | 0.4 | 1.7 | 10.3 |
| $23DMC_4$ | 4.1 | 1.85 | 3.0 | 3.9 |
| $2MC_5$ | 15.8 | 11.1 | 13.45 | 12.9 |
| $3MC_5$ | 12.5 | 9.4 | 11.0 | 7.9 |
| $nC_6$ | 12.1 | 19.6 | 15.9 | 15.0 |
| $C_7$ | 3.5 | 4.4 | 3.9 | 3 |
| $CC_5$ | 0.4 | 1.4 | 0.9 | 0.5 |
| $MCC_5$ | 3.6 | 4.1 | 3.85 | 5.2 |
| $CC_6$ | 0 | 1.75 | 0.85 | 5.1 |
| Benzene | 21.5 | 0.7 | 11.1 | — |
| RON | 80.3 | 65 | 72.9 | 74.8 |

The gain in octane number (RON) between the isomerisation unit feed and its effluent was very small. The octane number (RON) fell with respect to the light reformate.

Note: in the Tables above:
$22DMC_4$=2,2-dimethylbutane
$23DMC_4$=2,3-dimethylbutane
$2MC_5$=2-methylpentane
$3MC_5$=3-methylpentane
$CC_5$=cyclopentane
$MCC_5$=methyl cyclopentane
$CC_6$=cyclohexane

We claim:

1. A process for reducing the benzene content of petrol fractions and isomerising paraffins, comprising conducting isomerisation on a mixture of a) a feed defined by the following composition by weight: 40% to 80% of paraffins, 0.5% to 7% of cyclic hydrocarbons and 6% to 45% of aromatics, and by a maximum distillation temperature of 70° C. to 90° C., b) a $C_5$–$C_6$ cut defined by a paraffin content of more than 90% by weight, a cyclic hydrocarbon content of less than 10% by weight and a benzene content of less than 1.5% by weight, and c) a chlorine-containing compound, in contact with a catalyst comprising 4% to 15% of at least one halogen and at least one group VIII metal on a support which consists essentially of eta alumina and gamma alumina, the eta alumina content being between 85% and 95% by weight with respect to the support, the complement to 100% of the support being gamma alumina.

2. A process according to claim 1, wherein the isomerisation is carried out under the following operating conditions: a temperature of between 100° C. and 300° C., a partial pressure of hydrogen of between atmspheric pressure and 70 bar, a space velocity of between 0.2 and 10 liters of feed per liter of catalyst per hour, a hydrogen/feed molar ratio at the reactor inlet such that the hydrogen/feed molar ratio in the effluent is greater than 0.06, and with a chlorine compound being added to the mixture such that the chlorine concentration is between 50 and 5000 ppm.

3. A process according to claim 1, wherein said eta alumina content in the catalyst support is between 88% and 92% by weight.

4. A process according to claim 1 wherein the group VIII metal is selected from the group constituted by platinum, palladium and nickel.

5. A process according to claim 1 wherein the eta alumina has a specific surface area of between 400 and 600 m$^2$/g and a pore volume of between 0.3 and 0.5 cm$^3$/g.

6. A process according to claim 1 wherein the gamma alumina has a specific surface area of between 150 and 300 m$^2$/g and a pore volume of between 0.4 and 0.8 cm$^3$/g.

7. A process according to claim 1 wherein the halogen content is 6% to 15%.

8. A process according to claim 1 wherein the halogen is chlorine.

9. A process according to claim 1 wherein the $C_5$–$C_6$ cut is a straight run cut.

10. A process according to claim 1 wherein said mixture contains 10% to 90% of said $C_5$–$C_6$ cut.

11. A process according to claim 2, wherein said eta alumina content in the catalyst support is between 88% and 92% by weight.

12. A process according to claim 11, wherein the group VIII metal is selected from the group constituted by platinum, palladium and nickel.

13. A process according to claim 12, wherein the eta alumina has a specific surface area of between 400 and 600 m$^2$/g and a pore volume of between 0.3 and 0.5 cm$^3$/g.

14. A process according to claim 13, wherein the gamma alumina has a specific surface area of between 150 and 300 m$^2$/g and a pore volume of between 0.4 and 0.8 cm$^3$/g.

15. A process according to claim 14, wherein the halogen content is 6% to 15%.

16. A process according to claim 15, wherein the halogen is chlorine.

17. A process according to claim 16, wherein the $C_5$–$C_6$ cut is a straight run cut.

18. A process according to claim 17, wherein said mixture contains 10% to 90% of said $C_5$–$C_6$ cut.

19. A process according to claim 1, wherein the amount of chlorine compound in the mixture is such that the chlorine concentration is between 100 and 1000 ppm.

* * * * *